United States Patent
Nafe et al.

(10) Patent No.: US 10,542,420 B2
(45) Date of Patent: Jan. 21, 2020

(54) DETERMINING THE OPERATIONAL CHARACTERISTICS AND CONFIGURATION FOR WIRELESS DEVICES

(71) Applicant: DISH Technologies L.L.C., Englewood, CO (US)

(72) Inventors: Francis Nafe, Denver, CO (US); Christopher William Bruhn, Aurora, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 16/196,303

(22) Filed: Nov. 20, 2018

(65) Prior Publication Data

US 2019/0090127 A1  Mar. 21, 2019

Related U.S. Application Data

(60) Continuation of application No. 15/850,742, filed on Dec. 21, 2017, now Pat. No. 10,182,344, which is a division of application No. 14/822,621, filed on Aug. 10, 2015, now Pat. No. 9,894,513.

(51) Int. Cl.

| | |
|---|---|
| *H04W 8/24* | (2009.01) |
| *H04L 29/08* | (2006.01) |
| *H04L 12/24* | (2006.01) |
| *H04L 12/26* | (2006.01) |
| *H04W 16/14* | (2009.01) |
| *H04W 84/18* | (2009.01) |

(52) U.S. Cl.
CPC .......... *H04W 8/24* (2013.01); *H04L 41/0813* (2013.01); *H04L 41/0853* (2013.01); *H04L 43/0882* (2013.01); *H04L 67/303* (2013.01); *H04W 16/14* (2013.01); *H04W 84/18* (2013.01)

(58) Field of Classification Search
CPC . H04W 16/14; H04W 72/0453; H04W 84/12; H04W 84/18; H04W 8/24; H04W 4/02; H04L 67/303; H04L 47/14
See application file for complete search history.

(56) References Cited

U.S. PATENT DOCUMENTS

| | | |
|---|---|---|
| 7,072,691 B2 | 7/2006 | Cromer et al. |
| 7,117,013 B2 | 10/2006 | Cromer et al. |
| 7,366,304 B2 | 4/2008 | Cromer et al. |
| 8,280,433 B2 | 10/2012 | Quinn et al. |
| 2004/0174928 A1 | 9/2004 | Siwiak et al. |
| 2007/0060158 A1 | 3/2007 | Medepalli et al. |

(Continued)

OTHER PUBLICATIONS

Beals, William Michael, "Customer Service Call Routing," U.S. Appl. No. 14/185,723, filed Feb. 20, 2014; 47 pgs.

(Continued)

*Primary Examiner* — Margaret G Mastrodonato
(74) *Attorney, Agent, or Firm* — Seed IP Law Gropu LLP

(57) ABSTRACT

Embodiments are directed towards collecting information regarding the implementation of dynamic frequency selection and automatic channel selection by one or more wireless communication devices. And to use the collected information to determine if other communication devices are coupled to communicate with each other via a wireless connection or a wired connection, or to modify the automatic channel selection mechanism used by one or more wireless communication devices.

20 Claims, 6 Drawing Sheets

(56) References Cited

U.S. PATENT DOCUMENTS

| | | |
|---|---|---|
| 2007/0097891 A1 | 5/2007 | Kitchin |
| 2009/0325481 A1 | 12/2009 | Mohebbi |
| 2010/0046483 A1 | 2/2010 | Nandagopalan |
| 2011/0004893 A1 | 1/2011 | Borislow et al. |
| 2013/0029606 A1 | 1/2013 | Wang et al. |
| 2013/0033995 A1 | 2/2013 | Kraglund et al. |
| 2013/0039181 A1 | 2/2013 | Chao |
| 2013/0265907 A1 | 10/2013 | Kim et al. |
| 2014/0090003 A1 | 3/2014 | Eguchi et al. |
| 2015/0237204 A1 | 8/2015 | Beals |
| 2015/0264614 A1* | 9/2015 | Stager ............... H04W 36/0061 370/332 |

OTHER PUBLICATIONS

"In the Matter of Revision of Part 15 of the Commission's Rules to Permit Unlicensed National Information Infrastructure (U-NII) Devices in the 5 GHz Band," ET Docket No. 13-49; Federal Communications Commission, Adopted Mar. 31, 2014; 59 pgs.

"U-NII," https://en.wikipedia.org/wiki/U-NII, retrieved Aug. 13, 2015; 3 pgs.

* cited by examiner

DETERMINING THE OPERATIONAL CHARACTERISTICS AND CONFIGURATION FOR WIRELESS DEVICES

BACKGROUND

Technical Field

The present disclosure relates to the field of wirelessly transmitting data and, in particular, to determining the suitability or configuration for deploying a U-NII wireless device in a specified geographical area.

Description of the Related Art

People often have multiple televisions in their home. Historically, each television that was plugged into a coaxial-cable jack could receive content from a content service provider. However, recent developments in technology and standards have popularized the use of the set-top box. Now, televisions may be connected to set-top boxes to receive content from the content service provider. Often the set-top box provides the content to the television via a wired connection. But more recently, the popularity of using wireless technology to connect set-top boxes and televisions has increased. While wireless connections provide flexibility in the placement of televisions relative to the set-top box, wireless connections provide many other challenges due to the real-time nature of the content. So the use of wireless connections should provide content in a manner that maintains a user experience that is comparable to the user experience obtained when using a wired connection, such as smooth video playback.

The flexibility of wireless technology also can lead to the use of an increased number of wireless devices and wireless connections in a home. However, increasing the number of wireless devices in a home can also increase the likelihood of disruptions in the wireless connections due to the limited number and shared nature of wireless radio channels. This problem can greatly increase in densely populated areas, such as apartment buildings, especially near government radar systems, such as airports.

Wireless devices operating in the U-NII (Unlicensed National Information Infrastructure) radio band, which many set-top boxes do, may operate in 4 different ranges or sub-bands: U-NII-1, U-NII-2, U-NII-2 extended or U-NII-2e, or U-NII-3. Each of these bands is separated into multiple channels, with each channel having a different specified bandwidths. Under Federal Communication Commission rules, wireless devices are required to use Dynamic Frequency Selection when operating in the U-NII-2 and U-NII-2e bands. Dynamic Frequency Selection, otherwise known as dynamic frequency switching or "RADAR avoidance," is a mechanism designed to avoid co-channel interference with incumbent Federal radar systems by dynamically detecting radar signals and avoiding co-channel operation with those systems.

Government radar systems, including Terminal Doppler Weather Radar systems, sometimes operate in the U-NII-2 or U-NII-2e bands. Wireless device transmissions can interfere with the operation or effectiveness of these incumbent radar systems if they transmit in the same bands that the incumbent radar systems are operating. Because the government radar systems are considered to be mission critical, wireless devices using these bands are required to use Dynamic Frequency Selection to reduce the possibility of interfering with the incumbent radar systems.

Prior to the start of any transmission, a wireless device equipped with Dynamic Frequency Selection capability must continually monitor the radio environment for radar's presence. If the wireless device determines that a radar signal is present in a given channel, it must utilize an automatic channel selection mechanism to either select another channel to avoid interference with radar, or go into a "sleep mode" if no other channel is available.

BRIEF SUMMARY

Briefly stated, embodiments are directed towards collecting operational characteristics information, including the implementation of dynamic frequency selection or automatic channel selection, from one or more wireless communication devices to determine if new communication devices that are installed proximate to the one or more wireless communication devices can be coupled to communicate with one another over a wireless connection using the U-NII radio band, or if the new communication devices should be coupled to communicate via a wired connection. In some embodiments, the operational characteristics information may be utilized to modify the automatic channel selection mechanism of one or more previously installed wireless communication devices.

DETAILED DESCRIPTION

Figure 1:
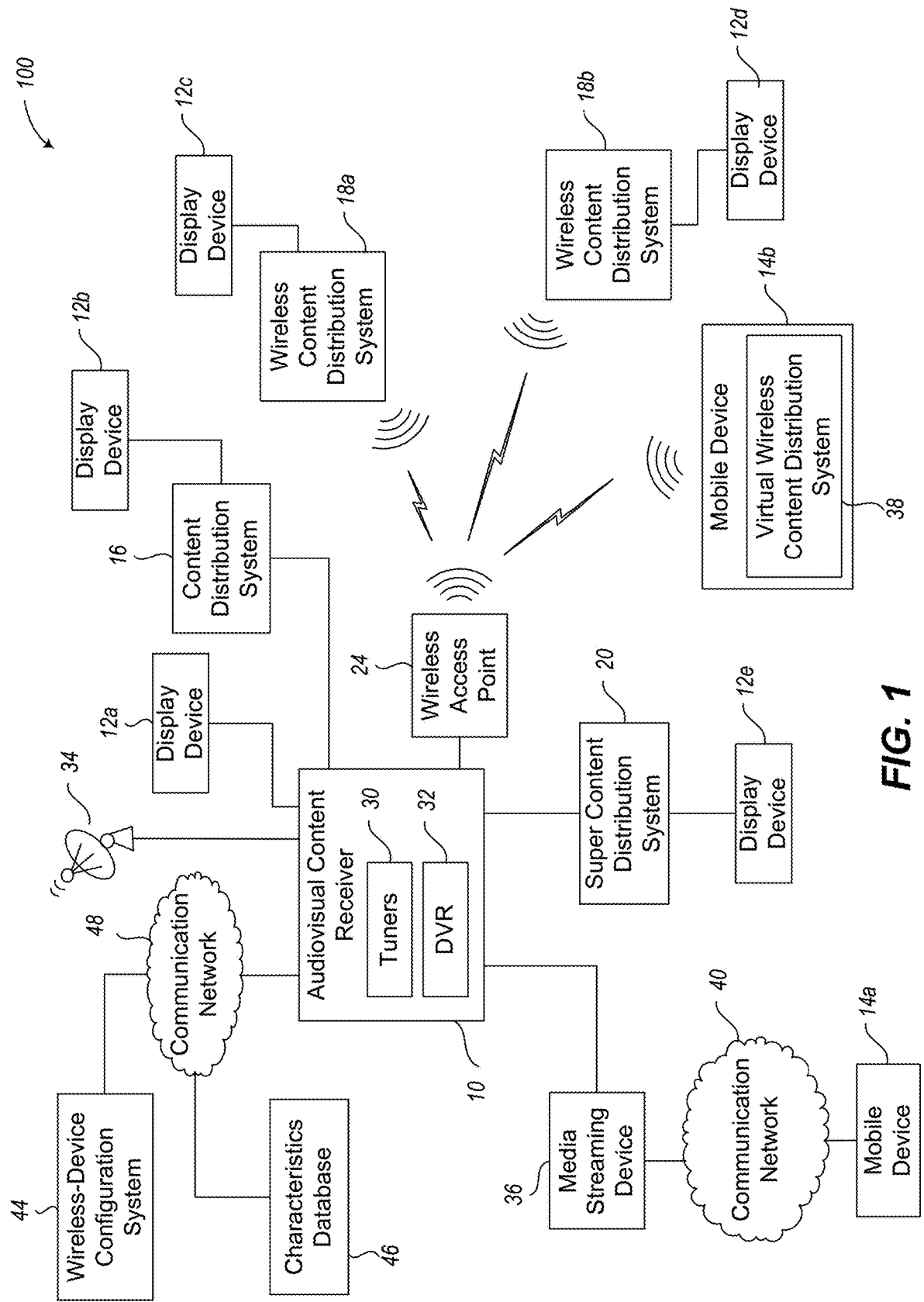
FIG. 1 is a context diagram that illustrates one example of one embodiment of an environment that includes wireless devices that communicates in the U-NII band.

FIG. 1 is a context diagram that illustrates one example of one embodiment of an environment that includes wireless devices that communicates in the U-NII radio band. Example environment 100 includes a variety of different audiovisual content receivers or distribution systems to provide content to display devices for presentation to a user or customer of a content service provider.

Content is provided to an audiovisual content receiver 10 via one or more mechanism. For example, content may be provided to the audiovisual content receiver 10 via satellite transmissions and an antenna 34. The audiovisual content receiver 10 may receive the content by other mechanisms not shown, such as but not limited to a wired or wireless internet connection, a wired cable connection, or the like.

The content may be generated or otherwise provided by a content provider (not shown). Sometimes, content providers are referred to as "channels." Examples, of content providers may include, but are not limited to, film studios; television studios; network broadcasting companies; independent content producers, such as AMC, HBO, Showtime, or the like; or other entities that provide content for user consumption. A content provider may also include individuals that capture personal or home videos, and distribute these videos to others over various online media-sharing websites or other distribution mechanisms. In some embodiments, a content distributor (not shown) may modify the content, such as by adding subtitles, advertisements, or other information, prior to transmitting the content to the audiovisual content receiver 10.

The audiovisual content receiver 10 includes one or more television tuners 30 and may include a digital video recorder (DVR) 32. Examples of the audiovisual content receiver 10 may include, but are not limited to, a set-top box, a cable connection box, a computer, or the like. The audiovisual content receiver 10 may be configured to provide content to a display device 12.

The display device 12 may be any kind of visual content display device, such as, but not limited to a television, monitor, projector, or other display device. In some embodiments a display device 12a may be within a same room as the audiovisual content receiver 10 and coupled to the audiovisual content receiver 10 via a wired or wireless (not shown) connection. Other display devices 12b-12e may be remote to the audio visual content receiver 10, such as in another room. The display devices 12b-12e may not receive content directly from the audiovisual content receiver 10, but rather from a content distribution system that communicates with the audiovisual content receiver to obtain the content. For example, display device 12b is coupled to a content distribution system 16; the display devices 12c and 12d are coupled to wireless content distribution systems 18a and 18b, respectively; and a display device 12e is coupled to a super content distribution system 20. The display devices 12b-12e may be coupled to their corresponding content distribution systems via a wired connection or a wireless connection (not shown).

The content distribution system 16 is a client module or device that provides remote access to the functionality of the audiovisual content receiver 10. The content distribution system 16 enables a user to access tuners 30 and DVR 32 to stream content from the audiovisual content receiver 10, which can provide the user with an experience as if the user was directly interacting with the audiovisual content receiver 10. The content distributions system 16 is generally located remote but is proximate to the audiovisual content receiver 10, such as in a different room in the home or premises. In this way, a user can view content on a television that is in a room separate from the audiovisual content receiver 10. The content distribution system 16 is often coupled to the audiovisual content receiver 10 via a wired connection.

The wireless content distribution system 18 has similar functionality to that of the content distribution system 16 in that it provides remote access to the functionality of the audiovisual content receiver 10. But the wireless content distribution system 18 is coupled to the audiovisual content receiver 10 via a wireless connection through a wireless access point 24. The wireless access point 24 may be embodied with the audiovisual content receiver 10 or it may be a separate standalone piece of hardware that is coupled to the audiovisual content receiver 10 via a wired connection.

In various embodiments, the wireless content distribution system 18 and the wireless access point 24 are configured to transmit and receive wireless signals using a plurality of channels within the U-NII radio band or spectrum. Wireless communication devices and systems that operate in the U-NII band may be referred to as U-NII devices, U-NII wireless devices, or the like. So, wireless content distribution system 18 and wireless access point 24 are both U-NII devices. Since these devices communicate using the U-NII radio band, the wireless content distribution system 18 and the wireless access point 24 implement dynamic frequency selection and automatic channel selection to change a selection among the plurality of channels in the U-NII band in which to transmit signals to one another.

When operating on U-NII-2 and U-NII-2e bands (both together commonly referred to as the "DFS band"), devices implement dynamic frequency selection, which means that devices must monitor for radio transmissions that are deemed most important (e.g., TDWR) and take steps to avoid interference with these transmissions (e.g. stop using the channel where the transmissions are occurring), as described herein. Once the dynamic frequency selection determines that there are radio transmissions that are to be avoided, automatic channel selection employs a mechanism or algorithm to determine what channels to use and/or jump to. Embodiments described herein utilize information associated with the dynamic frequency selection and/or the automatic channel selection to determine if two devices can be connected via a wired connection or a wireless connection. Other embodiments described herein utilize this information to modify the automatic channel selection mechanism.

For example, the automatic channel selection mechanism of Device_A may prefer to start up on CH132/80 (which may be a "DFS channel"). But by employing embodiments described herein, it may be determined that other devices installed in the same area as Device_A consistently detect radar that must be avoided on this same channel. The automatic channel selection mechanism of Device_A may then be modified and/or updated so that it avoids using and/or starting up on this channel. This modification/update may be beneficial since Device_A will probably detect the radar to be avoided and will need to jump to a different channel, which can cause disruptions to video streaming. In one example, the automatic channel selection algorithm can be employed to always prefer to jump to a channel in the U-NII-3 band (which is "non-DFS band") since those channels can be immediately used for transmissions and they run at a higher power then U-NII-1 (another "non-DFS band"). However, embodiments are not so limited and other automatic channel selection mechanisms and preferences may be employed.

Also, the location and proximity of the wireless content distribution system 18 relative to the wireless access point 24 may be limited due to range limits of U-NII devices resulting from transmission power limits imposed on U-NII devices using the U-NII band. As described above, the wireless access point 24 may be embodied in the audiovisual content receiver 10, in which case the audiovisual content receiver 10 is a U-NII device that can communicate with the wireless content distribution systems 18.

The super content distribution system 20 has similar functionality to that of the audiovisual content receiver 10 including its own DVR (not shown) or tuners (not shown), and similar functionality to that of the content distribution system 16 in that it provides remote access to the functionality of the audiovisual content receiver 10. The super content distribution system 20 is coupled to the audiovisual content receiver 10 to provide enhanced capabilities of the audiovisual content receiver 10, such as the ability to record additional television channels, increased DVR storage capacity, or the like. The super content distribution system 20 is generally coupled to the audiovisual content receiver via a wired or wireless (not shown) connection.

In various embodiments, the audiovisual content receiver 10 is also configured to provide content to a mobile device 14 of the user. The audiovisual content receiver 10 typically receives content from the content provider, stores at least a temporary copy of the content, and retransmits, streams, or otherwise transfers the content to the mobile device 14. The mobile device 14 may be a mobile phone or smartphone, a tablet computer, a laptop computer, desktop computer, or other computing device of the user. Typically the mobile device 14 includes a media player application that enables a user to interact with and obtain content from the audiovisual content receiver 10.

In some embodiments, a mobile device 14b may access audiovisual content from the audiovisual content receiver 10 wirelessly through the wireless access point 24 without the use of a media streaming device 36. In at least one such embodiment, the mobile device 14b may include a virtual wireless content distribution system 38 that is configured to connect to the audiovisual content receiver 10 in a manner similar to the wireless content distribution system 18. In various embodiments, the mobile device 14b is configured to transmit and receive wireless signals using a plurality of channels within the U-NII band similar to that of the wireless content distribution system 18. So the mobile device 14b may also be a U-NII device and implement dynamic frequency selection and automatic channel selection. The mobile device 14b can enable users to watch live or previously recorded programs on their mobile device 14b when the mobile device 14b is within range of the wireless access point 24, such as at home. But the distance between the mobile device 14b and the wireless access point 24 may be limited due to range limits of U-NII devices resulting from transmission power limits imposed on U-NII devices using the U-NII band.

In some other embodiments, a media streaming device 36 may be utilized to provide content from the audiovisual content receiver 10 to a mobile device 14a of the user via a communication network 40. The media streaming device 36 may be a Slingbox or other device that is configured to transmit audiovisual content from the audiovisual content receiver 10 to a mobile device 14a over a communication network 40. The communication network 40 may include one or more wired or wireless networks that are configured to couple various computing devices to transmit content/data from one or more devices to one or more other devices. For example, the communication network 40 may be the Internet, X.25 networks, or a series of smaller or private connected networks that carry the content and other data.

A media player application on the mobile device 14a connects to the media streaming device 36 or the audiovisual content receiver 10 via the media streaming device 36, such as by way of a username and password. Once connected, the media streaming device 36 obtains the content from the audiovisual content receiver 10; it then encodes the content and transmits the encoded content to the mobile device 14a via the communication network 40. The content is encoded according to a number of parameters such as resolution, streaming bit rate, frame rate, and so on. As the mobile device 14a receives the encoded content, it utilizes the media player application to decode, render, and play the content for the user. Since the mobile device 14a utilizes communication network 40, the location or proximity of the mobile device 14a to the audiovisual content receiver 10 is not limited to the range limits of U-NII devices, but rather limited to the extent that the mobile device 14a has access to the communication network 40. In this way, the user can access their content when away from home and when out of range of the wireless access point 24.

In various embodiments, environment 100 may also include a wireless-device configuration system 44 and a characteristics database 46, which may be maintained by a content service provider. The characteristics database 46 may be a centralized database of use profiles for a plurality of U-NII devices. The characteristics database 46 may generate use profiles from operational characteristics or other information obtained from various different U-NII devices, such as the wireless content distribution systems 18, the wireless access point 24, the mobile device 14b, or the like. The obtained information may include, but is not limited to, dynamic frequency selection information, automatic channel selection information, system health information, device location information, or other data. The dynamic frequency selection information or automatic channel selection information may include, for example, current channel of operation, current data transfer rate, number of channel changes within a given time period, signal strength of access points and clients at time of channel change, or the like. Use profiles may also include other information, such as, but not limited to, proximity to known Terminal Doppler Weather Radar terminals, proximity to other known users or customers, or the like. Although FIG. 1 illustrates one user's home environment, the characteristics database 46 may collect information from a plurality of U-NII devices from a plurality of different users.

The characteristics database 46 may obtain information from the U-NII devices through a variety of different mechanism. In some embodiments, the audiovisual content receiver 10 may collect information from each wireless content distribution system 18, wireless access point 24, or other U-NII device that communicates with the audiovisual content receiver 10. Once collected, the audiovisual content receiver 10 periodically provides the information to the characteristics database 46 via communication network 48. In other embodiments, the characteristics database 46 may obtain the frequency selection information from the U-NII devices without being collected by the audiovisual content receiver 10, which is not illustrated. For example, the wireless content distribution system 18 may be connected (not shown) to the communication network 48 in which it can transmit operational characteristic information to the characteristics database 46. In another example, the wireless access point 24 may be connected (not shown) to the communication network 48 and can be used by the wireless content distribution system 18 to provide information to the characteristics database 46. Embodiments, however, are not so limited and other mechanisms may be employed for providing operational characteristics information of U-NII devices to the characteristics database 46. The communication network 48 may be an embodiment of the communication network 40, a different wired or wireless network, or the like.

The wireless-device configuration system 44 may be configured to utilize the use profiles stored by the characteristics database 46 to determine if a communication device should be coupled to another communication device via a wireless connection or a wired connection at a particular location, as described herein. Briefly, the wireless-device configuration system 44 obtains, from the characteristics database 46, use profiles of U-NII devices that are proximate to the particular location. Based on the obtained use profiles, the wireless-device configuration system 44 determines if the use profile(s) meet at least one threshold criteria, and if so, the communication devices can be wirelessly coupled to communicate via the U-NII band; otherwise, the communication devices should be coupled via a wired communication. In various embodiments, U-NII devices may be proximate to a location of another U-NII device if there is a possibility of co-channel interference by the devices, which may be determined based on range limits of U-NII devices resulting from transmission power limits imposed on U-NII devices using the U-NII band.

In some embodiments, the wireless-device configuration system 44 may analyze use profiles for one or more U-NII devices that are located within a predetermined proximity to at least one target U-NII device. Based on the analysis, the wireless-device configuration system 44 may determine at least one configuration update for at least one target U-NII device and provide the update to that device. In some embodiments, the configuration update may include updating the automatic channel selection algorithm of at least one target U-NII device. In at least one such embodiment, the analysis of the use profiles may determine at least one pattern of channel changes among the one or more U-NII devices. The wireless-device configuration system 44 can modify the automatic channel selection algorithm of each of the one or more U-NII devices or at least one target U-NII device based on the determined at least one pattern. In various embodiments, the wireless-device configuration system 44 provides the modified automatic channel selection algorithm to the corresponding U-NII devices via the audiovisual content receiver 10 or an internet connection with the U-NII devices (not illustrated). For example, the modified automatic channel selection algorithm may be provided to the wireless content distribution system 18 as a system, firmware, or other software update.

In various embodiments, the wireless-device configuration system 44 and the characteristics database 46 may be embodied in a same server device, or they may be employed as separate server devices. In other embodiments, the wireless-device configuration system 44 may be a standalone device that can be carried by a technician to a user's home or premises, and employed to determine if new wireless content distribution systems 18 for the user should be coupled to the audiovisual content receiver 10 of the user via a wireless connection or a wired connection. In at least one such embodiment, the standalone wireless-device configuration system 44 may monitor U-NII band channel utilization instead of use profiles to determine if at least one threshold criteria is met.

It should be appreciated the environment illustrated in FIG. 1 may be for a user to access audiovisual content while at home on a television, such as display device 12, or on their mobile device, and it may include more or less devices or components than what is illustrated. As one non-limiting example, a user may only have one wireless content distribution system 18 and no super content distribution system 20, but other configurations, arrangements, and numbers of devices is also envisaged. Similarly, each customer of a content service provider may employ embodiments of systems illustrated in FIG. 1 such that operational characteristics information is stored at a central database for the content service provider.

Figure 2:
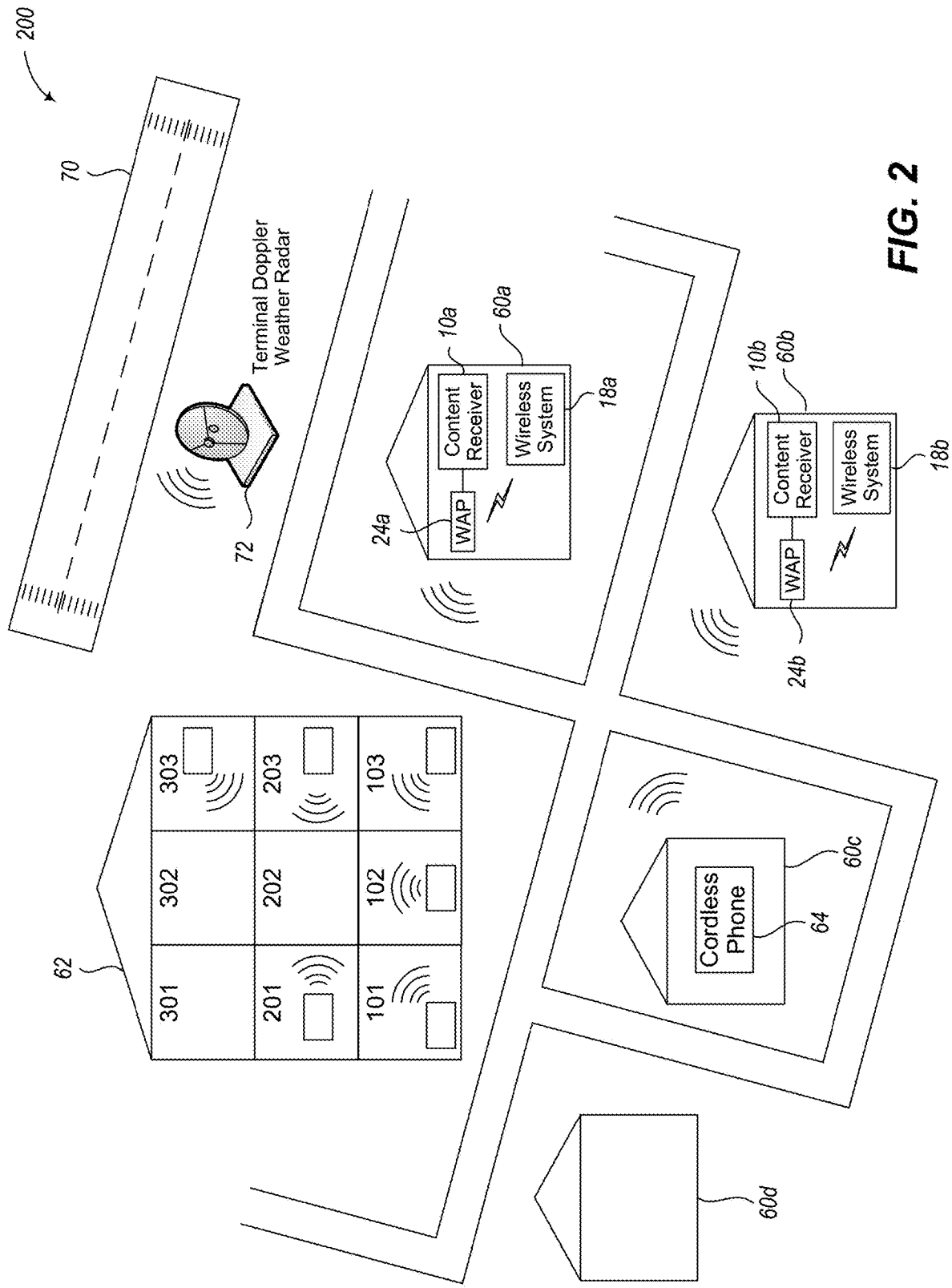
FIG. 2 is a diagram that illustrates an example of a neighborhood with a weather radar system and multiple devices that communicate in the U-NII band.

FIG. 2 is a diagram that illustrates an example of a neighborhood with a weather radar system and multiple devices that communicate in the U-NII band. As illustrated, example neighborhood 200 includes an airport 70, an apartment complex 62, and multiple housing units 60. The airport 70 includes, among other airport-related facilities, a Terminal Doppler Weather Radar system 72 that may be used for the detection of hazardous wind shear conditions, precipitation, and winds aloft on and near the airport 70. The housing units 60 may include various different U-NII devices. For example, the housing units 60a-60b may each have at least one wireless content distribution system 18 that communicates, using the U-NII radio band, with a wireless access point 24 to obtain audiovisual content from an audiovisual content receiver 10, such as various embodiments of the systems illustrated by example environment 100 of FIG. 1. As another example, housing unit 60c may have a cordless phone that also operates in the U-NII radio band. The apartment complex 62 includes a plurality of different apartment units, some of which may have one or more U-NII devices. For example, one or more of the apartment units may have systems similar to those described above in conjunction with FIG. 1.

As described elsewhere herein, the U-NII devices in neighborhood 200 utilize dynamic frequency selection and automatic channel selection to avoid co-channel interference with each other and to avoid interfering with the operation of the Terminal Doppler Weather Radar system 72. Due to the close proximity of the apartment complex 62, the housing units 60, and the Terminal Doppler Weather Radar system 72, each U-NII device operating in the neighborhood 200 may be constantly changing channels to avoid each other's communications and to avoid interfering with the Terminal Doppler Weather Radar system 72. But the total number of channels available in the U-NII radio band is limited. So as the number of U-NII devices increases in close proximity to one another, the number of available channels that avoid interference for use by the current U-NII devices will decrease along with an increase in the likelihood that some U-NII devices may have intermittent connections with one another due to interference or lack of channel access.

In some situations, intermittent wireless connections may not be noticeable to a user or may have tolerable delays while waiting for channel access to become available or interference to subside, such as, for example, accessing email, sending instant messages, or the like. Other situations, however, may depend on more reliable wireless connections where an intermittent wireless connection can result in frozen or choppy audiovisual content, such as, for example, video streaming, video chatting, or the like. Accordingly, embodiments described herein may be employed to determine if an area, such as the neighborhood 200, can accommodate additional U-NII devices or if wired devices should be utilized.

For example, assume apartment units 101-103, 201-203, and 303 each have one or more U-NII devices, and that each of these U-NII devices, along with the U-NII devices in housing units 60, employ dynamic frequency selection and automatic channel selection. Information regarding changes in the selection of channels may be obtained from at least some of these devices. A use profile may be determined and stored in a centralized database, such as characteristics database 46 of FIG. 1, for each U-NII device from which channel selection changes are obtained. The use profile may include at least the obtained information and the location of the corresponding U-NII device.

Now assume that a tenant of apartment unit 202 wants to install a new content distribution system to access content from their audiovisual content receiver in a room separate from their audiovisual content receiver. The use profiles of one or more of the U-NII devices proximate to apartment unit 202 may be utilized to determine if the available channels are sufficient for the new content distribution system to effectively and reliably communicate wirelessly with a wireless access point of the tenant's audiovisual content receiver. If sufficiency is determined, a wireless content distribution system, such as wireless content distribution system 18 of FIG. 1, may be installed and coupled to a wireless access point of the audiovisual content receiver to communicate using the U-NII band. If wireless channel conditions are insufficient, a wired content distribution system, such as content distribution system 16 of FIG. 1, may be installed coupled to the audiovisual content receiver to communicate via a wired connection instead of a wireless connection.

Additionally, the use profiles of one or more of the U-NII devices may be utilized to modify or update the automatic channel selection algorithm of one or more U-NII devices. For example, a pattern of channel changes may be determined or identified from the use profile of the U-NII device in apartment unit 103. In some embodiments, the automatic channel selection algorithm for the U-NII device in apartment unit 103 may be modified based on the determined pattern. In other embodiments, the dynamic selection algorithm of other U-NII devices in other apartment units, for example apartment units 102 and 203, may be modified based on the determined pattern. It should be recognized that the use profiles of a plurality of U-NII devices may be utilized to modify the automatic channel selection algorithms of those same U-NII devices or of other different U-NII devices. Also, since utilization of the automatic channel selection can vary greatly from location to location, the use profiles used to modify automatic channel selection algorithms of target U-NII devices may be use profiles of U-NII devices that are proximate to the target U-NII devices. As described elsewhere herein, the devices may be proximate if there is a possibility of co-channel interference by the devices, which may be based on range limits of U-NII devices resulting from transmission power limits imposed on U-NII devices using the U-NII band.

Figure 3:
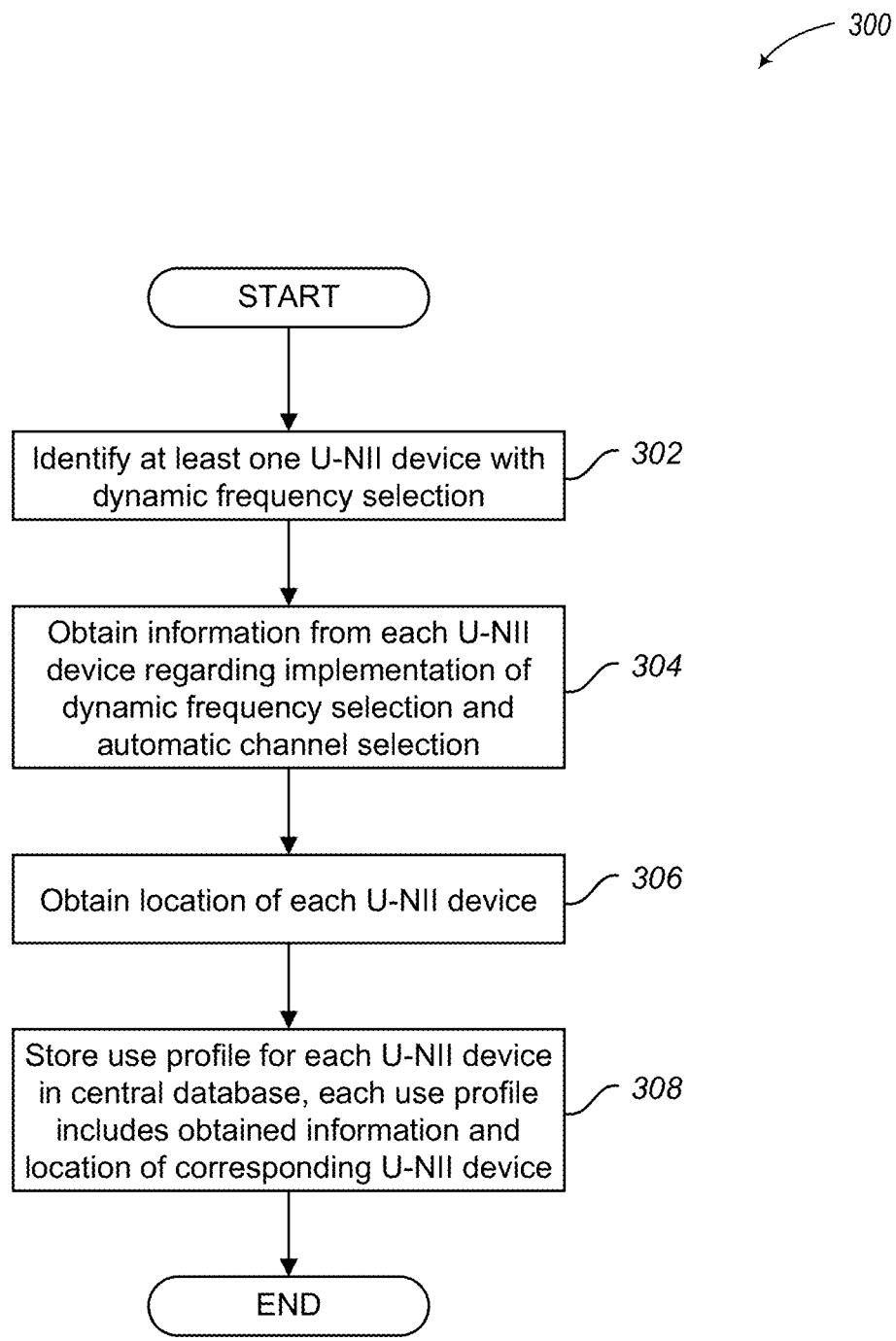
FIG. 3 is a dataflow diagram that illustrates one method of collecting dynamic frequency selection or automatic channel selection information in accordance with embodiments described herein.
Figure 4:
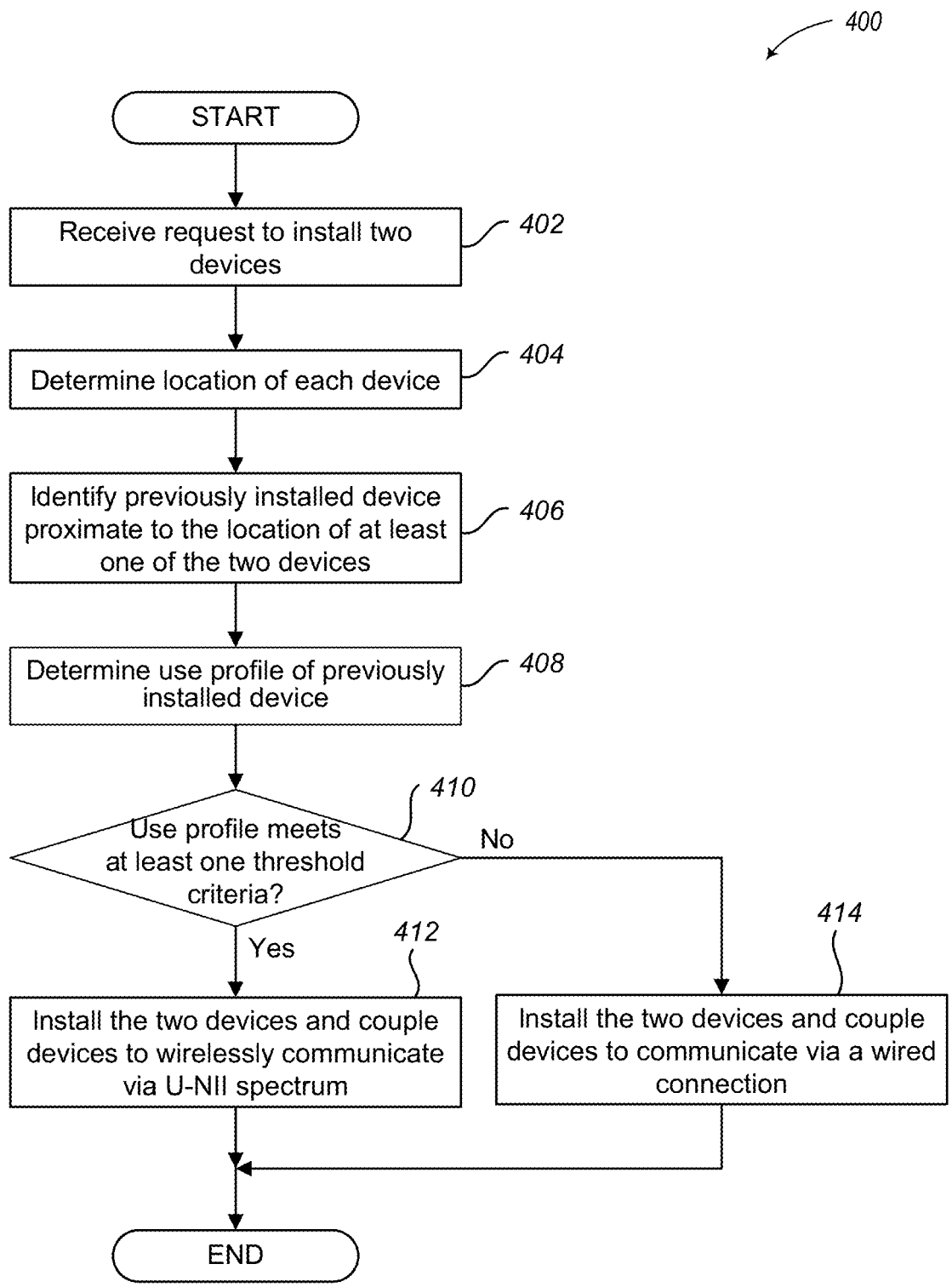
FIG. 4 is a dataflow diagram that illustrates one method of recommending whether newly installed devices communicate via a wireless connection or a wired connection a particular location in accordance with embodiments described herein.
Figure 5:
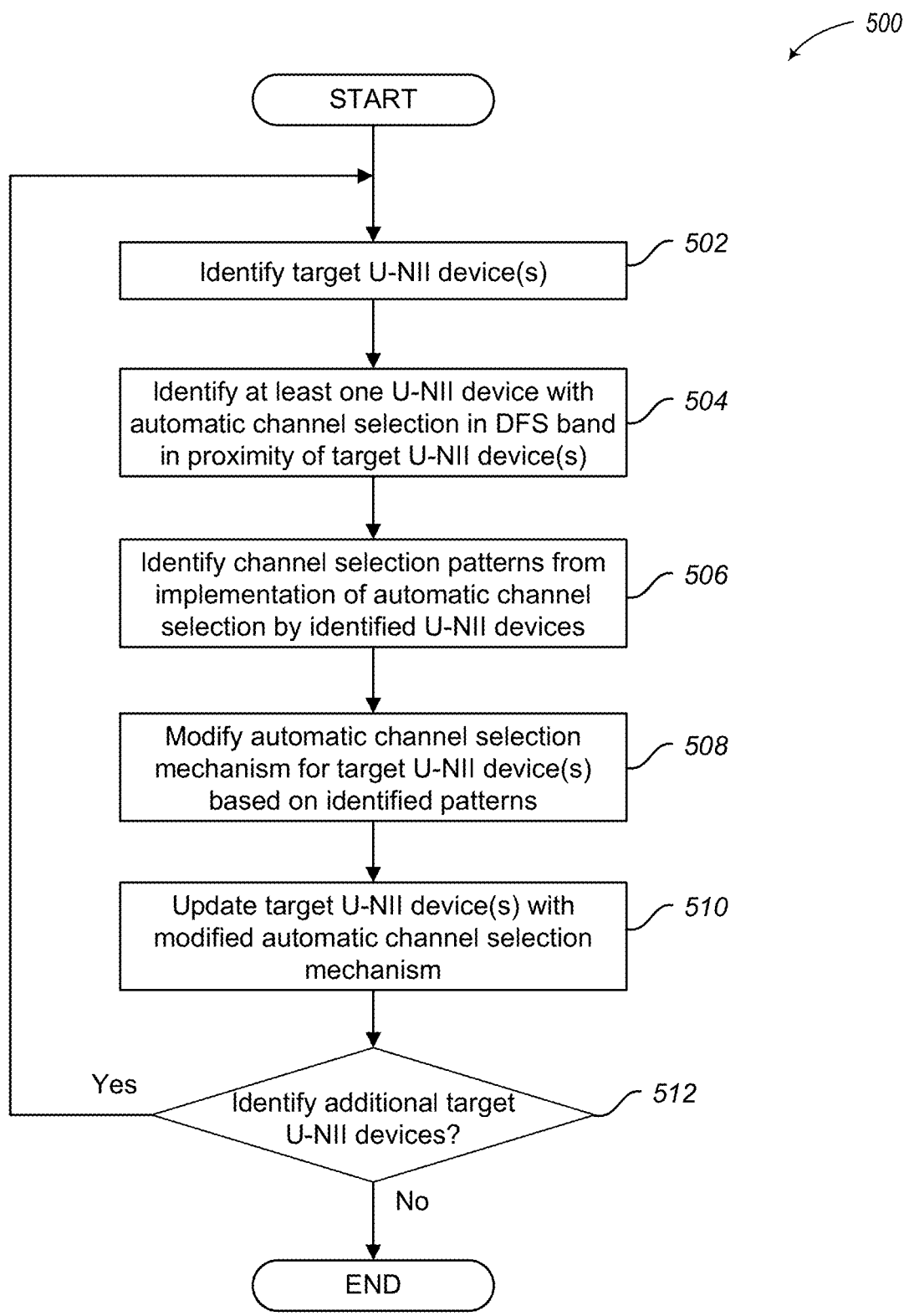
FIG. 5 is a dataflow diagram that illustrates one method of updating a wireless device that communicates in the U-NII band with an updated automatic channel selection algorithm in accordance with embodiments described herein.

In various embodiments, at least portions of processes 300, 400, or 500 of FIGS. 3, 4, and 5, respectively, may be performed by wireless-device configuration system 44 or characteristics database 46. However, embodiments are not so limited and other devices may also perform various aspects of these processes, such as, but not limited to, the audiovisual content receiver 10, the wireless content distribution system 18, other U-NII devices, or the like.

FIG. 3 is a dataflow diagram that illustrates one method of collecting dynamic frequency selection information and automatic channel selection information in accordance with embodiments described herein. Process 300 begins, after a start block, at block 302, where at least one U-NII device with dynamic frequency selection is identified. In various embodiments, the identified U-NII devices may include those devices that can provide dynamic frequency selection information, automatic channel selection information, or other operational characteristics information to a remote server, such as the characteristics database 46 in FIG. 1. For example, as described herein, a content service provider may provide content to a plurality of customers at various geographic locations. Each of these customers may employ embodiments of the environment and systems illustrated in FIG. 1, in which case the identified U-NII devices may include a plurality of the wireless content distribution systems 18, a plurality of the wireless access points 24, a plurality of the mobile devices 14b, or the like, utilized by a plurality of customers. Embodiments, however, are not so limited and other U-NII devices may also be identified.

Process 300 proceeds to block 304, where each identified U-NII device's utilization of dynamic frequency selection and automatic channel selection is obtained. In some embodiments, each U-NII device may monitor and at least temporarily store its own utilization and implementation of dynamic frequency selection and automatic channel selection. The U-NII devices may then transmit the monitored information to the remote server for storage. In some embodiments, the U-NII devices may provide a report to the remote server at predetermined time intervals, such as once a day; when a characteristics exceeds some threshold value, such as when the number of channel changes exceed a threshold value in a predetermined time period, or the like.

The obtained information may include a variety of different operational characteristics regarding the implementation of the dynamic frequency selection and automatic channel selection by each U-NII device. Such information may include, but is not limited to, a current channel of operation, a current data transfer rate, a number of channel changes within a given time period, a signal strength of wireless access points and client devices at time of channel change, or the like. In at least one embodiment, the client devices may be those U-NII devices that communicate with access points, such as, but not limited to wireless content distribution systems.

The U-NII devices may provide the operational characteristics information directly to the remote server or they may provide the information to an intermediate device that forwards the information to the remote server. For example, as described elsewhere herein, a wireless content distribution system may provide its operational characteristics information to a coupled audiovisual content receiver. The audiovisual content receiver may then provide the information to the remote server. But other mechanisms may also be employed to obtain the operational characteristics information of the identified U-NII devices. In other embodiments, the U-NII device or another device in communication with the U-II device may store the operational characteristics information for retrieval by a technician if the device is unable to transmit information to the remote server. For example, if a wireless content distribution system obtains content from an audiovisual content receiver that receives the content through a satellite connection without being connected to the internet, the receiver may store the operational characteristics information. In this way, a technician can later obtain the information for use as described herein.

In various embodiments, the remote server may collect other operational characteristics information regarding the U-NII devices or other devices that communicate with the U-NII devices, which may include information on the health of various devices and equipment, such as is described in U.S. patent application Ser. No. 14/185,723, entitled "Customer Service Call Routing."

Process 300 continues at block 306, where a location of each U-NII device is obtained. In some embodiments, the operational characteristics information provided by the U-NII device may include the U-NII device's location. In other embodiments, another database of U-NII device locations may be utilized. For example, a content service provider may have a database of each of its customers' locations and the U-NII devices employed at those locations, such as wireless access points 24 or wireless content distribution systems 18 utilized by a customer. In some embodiments, the location may be a street address, a zip code, a GPS coordinates, or the like, or a combination thereof.

Process 300 proceeds next to block 308, where a use profile for each U-NII device is stored in a central database, such as the characteristics database 46 in FIG. 1. A use profile may include the obtained information for a corresponding U-NII device and the location of that corresponding device. In some embodiments, the use profile may include other information, such as a proximity to known Terminal Doppler Weather Radar terminals; a proximity to other known U-NII device locations, such as other customers of the content service provider; or the like. Embodiments, however, are not so limited and other historic information may also be stored in the use profiles, such as, but not limited to, a number of channel changes made by the automatic channel selection over a period of time, an average data transfer rate over a period of time, an average bandwidth activity of the U-NII device or other U-NII devices that are detected by the U-NII device, or the like. In various embodiments, use profiles may also be stored by customer, location, neighborhood, or the like, rather than for each specific U-NII device. In this way, operational characteristics information for a plurality of U-NII devices may be grouped into one or more use profiles.

After block 308, process 300 may terminate or otherwise return to a calling process.

FIG. 4 is a dataflow diagram that illustrates one method of recommending whether newly installed devices communicate via a wireless connection or a wired connection a particular location in accordance with embodiments described herein.

Process 400 begins, after a start block, at block 402, where a request to install two communication devices is received. For ease of discussion these two communication devices will be referred to as the new communication devices, even if one or both of them are already installed at the customer's location. In some embodiments, the request may be from an existing customer to install additional wireless content distributions systems, wireless access points, or the like, so that the customer can remotely access content from their audiovisual content receiver. In other embodiments, the request may be for a new customer that would like to install an audiovisual content receiver with remote access via a wireless content distribution system.

Process 400 proceeds to block 404, where a location of each communication device is determined. In some embodiments, the location may be determined or obtained from the customer's records, a proposed location for a new customer, or the like.

Process 400 continues at block 406, where a previously installed communication device that is a U-NII device and that is proximate to the location of at least one of the new communication devices is identified. In some embodiments, the previously installed communication device may be another U-NII device of the customer, such as a previously installed wireless content distribution system. In other embodiments, the previously installed communication device may be a U-NII device of another customer or some other U-NII device that provides operational characteristics information to the characteristics database. As described elsewhere herein, the previously installed communication device may be proximate to at least one of the new communication devices if there is a possibility of co-channel interference by the previously installed communication device and the at least one new communication device.

Process 400 proceeds next to block 408, where a use profile of the previously installed communication device is determined. In various embodiments, the use profile may be determined based on the location of the previously installed communication device, an identifier of the previously installed communication device or the like. Once determined the use profile may be obtained from the characteristics database.

Process 400 continues next at decision block 410, where a determination is made whether the use profile meets at least one threshold criteria. In various embodiments, this determination may be made by comparing at least one of the parameter stored in the use profile with at least one threshold criteria. The threshold criteria may be based on one or more, or a combination of, different threshold values for the variety of information stored in the use profile. Examples of various threshold criteria may include, but are not limited to, a maximum number of channel changes within a given time period, a maximum time duration spent in a sleep mode while waiting for an available channel, a minimum average duration spent on a channel before changing channels, changes in the sub-band used, presence of a nearby Terminal Doppler Weather Radar terminal in which operation in the U-NII band by the new devices may interfere, a minimum data transfer rate, a minimum signal strength of wireless access points and client devices at time of channel change, a maximum number of other customers or U-NII devices within given distance from new devices, a minimum average data transfer rate over a period of time, a minimum average bandwidth activity, or the like, or some combination thereof. If the use profile meets the at least one threshold criteria, then process 400 continues at block 412; otherwise, process 400 continues at block 414.

At block 412, the new communication devices are installed and coupled to each other to communicate via a wireless connection using the U-NII radio band. In at least one embodiment, a wireless communication device, such as a wireless content distribution system 18 of FIG. 1, may be selected and installed rather than a wired communication device, such as content distribution system 16 of FIG. 1. After block 412, process 400 ends.

If the threshold criteria is not met, then process 400 continues from decision block 410 to block 414, where the new communication devices are installed and coupled to each other to communicate via a wired connection. In at least one embodiment, a wired communication device, such as a content distribution system 16 of FIG. 1, may be selected and installed rather than a wireless communication device, such as wireless content distribution system 18 of FIG. 1. After block 414, process 400 ends.

FIG. 5 is a dataflow diagram that illustrates one method of updating a wireless device that communicates in the U-NII band with an updated automatic channel selection algorithm in accordance with embodiments described herein.

Process 500 may begin, after a start block, at block 502, where one or more target U-NII devices in proximity to one another are identified. The target U-NII device(s) may be a wireless communication device, such as a wireless content distribution system, that is to obtain a new or modified automatic channel selection algorithm. In various embodiments, the target U-NII device(s) may be the new wireless communication devices installed at block 412 of FIG. 4. In other embodiments, the target U-NII devices may be devices of a customer who is having intermittent connection issues. In yet other embodiments, target U-NII devices may be U-NII devices that are ready for a system, firmware, or other software update, such as a monthly or quarterly update. Embodiments, however, are not so limited and other methods for determining a target U-NII device(s) may be determined, such as, for example, U-NII devices in a neighborhood, apartment complex, or the like.

Process 500 proceeds to block 504, where at least one U-NII device that implements automatic channel selection in the dynamic frequency selection band and is in proximity to the target U-NII device(s) is identified. In various embodiments, the locations of U-NII devices stored in the characteristics databased may be used to identify U-NII devices that are within a predetermined geographic distance from the location of the target U-NII device(s). In some embodiments, that predetermined distance may be substantially similar to or slightly greater than a maximum range that a signal transmitted on a U-NII band channel can travel given the transmission power limits imposed on U-NII devices using the U-NII band. In other embodiments, the proximity determination may be based on U-NII devices on a same street, in a same neighborhood, an apartment complex, or the like. In at least one embodiment, the identified U-NII device(s) may be or include the target U-NII device(s).

Process 500 continues at block 506, where the use profile of the identified U-NII device(s) is analyzed to identify at least one channel selection pattern from the implementation of automatic channel selection by the identified U-NII devices. In some embodiments, the patterns may indicate that one or more channels are used less often than other channels, certain channels are used by certain devices at specific times of day, or the like. It should be recognized that other more or less complex patterns could also be determined.

Process 500 proceeds next to block 508, where the automatic channel selection mechanism for the target U-NII device(s) is modified based on the identified patterns. For example, if the patterns indicate that a specific channel is used less than other channels, then that channel may be utilized as a default channel or an initial "next hop" channel. In another example, the automatic channel selection mechanism may be modified to avoid one or more channels or sub-bands within the U-NII band. Embodiments, however, are not so limited and other modifications may be made to the automatic channel selection mechanism based on the patterns of channels by the identified U-NII devices.

Process 500 continues next at block 510, where the automatic channel selection mechanism of the target U-NII device(s) is updated with the modified automatic channel selection mechanism. In some embodiments, the modified automatic channel selection mechanism may be provided or otherwise pushed to the target U-NII device(s) for storage and implementation by the target U-NII device.

Process 500 proceed to decision block 512, where a determination is made whether another target U-NII device or other target U-NII devices are identified, in which case process 500 loops to block 502; otherwise process 500 terminates or returns to a calling process.

Figure 6:
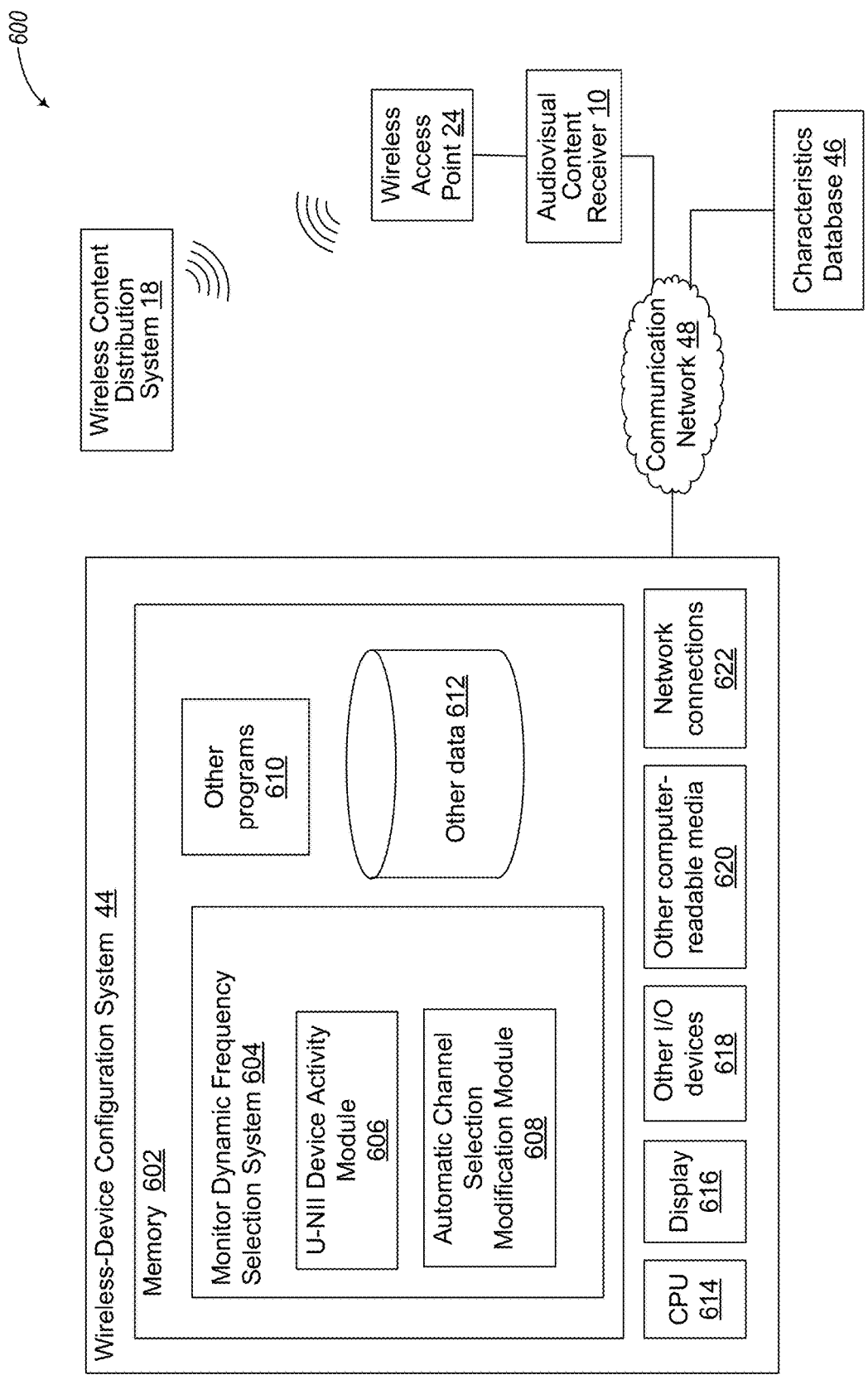
FIG. 6 is a system diagram illustrating one implementation of a computing system for implementing embodiments described herein.

FIG. 6 is a system diagram illustrating one implementation of a computing system for implementing embodiments described herein. System 600 includes wireless-device configuration system 44, characteristics database 46, audiovisual content receiver 10, and wireless content distribution system 18.

One or more general-purpose or special-purpose computing systems may be used to implement wireless-device configuration system 44, to determine if two computing devices should be coupled via a wireless connection or a wired connection as described herein. Accordingly, various embodiments described herein may be implemented in software, hardware, firmware, or in some combination thereof.

Wireless-device configuration system 44, may include memory 602, one or more central processing units (CPUs) 614, display devices 616, other I/O devices 618, other computer-readable media 620, and network connections 622 (configured to communicate with other computing devices via a wired or wireless communication network). Other I/O devices 618 may include a keyboard, audio interfaces, video interfaces, or the like.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon a monitor dynamic frequency selection system 604, which includes U-NII device activity module 606 and automatic channel selection modification module 608. U-NII device activity module 606 may employ various embodiments described herein to determine if two communication devices should be coupled via a wireless connection or a wired connection based on operational characteristics of U-NII device that are proximate to at least one of the two communication devices. Automatic channel selection modification module 608 may employ various embodiments described herein to modify the automatic channel selection algorithm of one or more target U-NII devices based on operational characteristics of the target U-NII device(s) or other U-NII device(s) that are proximate to the target U-NII device(s). Memory 602 may also store other data 612 or other programs 610.

In some embodiments, the wireless-device configuration system 44 may be a standalone unit that is enabled to communicate with the characteristics database 46 via communication network 48 to obtain use profiles or other operational characteristics of U-NII devices. In other embodiments, the characteristics database 46 may be included or embodied in various configurations of the wireless-device configuration system 44.

The characteristics database 46, the audiovisual content receiver 10, the wireless access point 24, and the wireless content distribution system 18 may be implemented by one or more general-purpose or special-purpose computing systems employing software, hardware, firmware, or some combination thereof to provide audiovisual content to a user as described herein. Accordingly, these devices and system include a CPU, memory, other computer readable media, I/O devices, and network connections, which may be similar to those same components described above for the wireless-device configuration system 44. As described herein, the audiovisual content receiver 10 and characteristics database 46 may communicate with each other or with wireless-device configuration system 44 via communication network 48.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet are incorporated herein by reference, in their entirety. Aspects of the embodiments can be modified, if necessary, to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   identifying a geographical area associated with a target communication device that is configured to transmit and receive wireless signals within the U-NII band and is configured to perform dynamic frequency selection;
   identifying a plurality of communication devices that are in the geographical area and that are configured to transmit and receive wireless signals within the U-NII band and that are configured to perform dynamic frequency selection;
   receiving information regarding performance of dynamic frequency selection by the plurality of communication devices; and
   modifying the dynamic frequency selection of the target communication device for selecting channel changes based on the received dynamic-frequency-selection-performance information.

2. The method of claim 1, wherein modifying the dynamic frequency selection of the target communication device comprises:
   determining, based on the received dynamic-frequency-selection-performance information, at least one pattern of channel changes among the plurality of communication devices; and
   modifying the dynamic frequency selection of the target communication device for selecting channel changes based on the at least one pattern.

3. The method of claim 1, wherein modifying the dynamic frequency selection of the target communication device comprises:
   determining, based on the received dynamic-frequency-selection-performance information, configuration updates for the target communication device; and
   sending the configuration updates to the target communication device.

4. The method of claim 1, wherein modifying the dynamic frequency selection of the target communication device comprises:
   updating an automatic channel selection algorithm used by the target communication device to perform the dynamic frequency selection.

5. The method of claim 1, further comprising:
   modifying the dynamic frequency selection of a subset of the plurality of communication devices for selecting channel changes based on the received dynamic-frequency-selection-performance information.

6. The method of claim 5, wherein modifying the dynamic frequency selection of the subset of target communication devices comprises:
   determining, based on the received dynamic-frequency-selection-performance information, at least one pattern of channel changes among the plurality of communication devices; and
   modifying the dynamic frequency selection of the subset of target communication devices for selecting channel changes based on the at least one pattern.

7. The method of claim 5, wherein modifying the dynamic frequency selection of the subset of target communication devices comprises:
   determining, based on the received dynamic-frequency-selection-performance information, configuration updates for the subset of target communication devices; and
   sending the configuration updates to the subset of target communication devices.

8. The method of claim 5, wherein modifying the dynamic frequency selection of the subset of target communication devices comprises:
   updating an automatic channel selection algorithm used by the subset of target communication devices to perform the dynamic frequency selection.

9. The method of claim 1, wherein the received dynamic-frequency-selection-performance information comprises at least one of channels of operation, data transfer rates, number of channel changes within a given time period, or a signal strength of access points at times of channel changes.

10. The method of claim 1, wherein the received dynamic-frequency-selection-performance information comprises at least one of:
    a number of channel changes made by the dynamic frequency selection performed by the plurality of communication devices over a first period of time;
    an average data transfer rate of the plurality of communication devices over the first period of time;
    a proximity of known Terminal Doppler Weather Radar systems to the geographic area; or
    an average bandwidth activity of the plurality of communication devices.

11. The method of claim 1, wherein identifying the plurality of communication devices comprises:
    selecting the plurality of communication devices that are located within a predetermined proximity to the target communication device.

12. The method of claim 1, wherein identifying the plurality of communication devices comprises:
    selecting the plurality of communication devices that are proximate to the target communication device to cause co-channel interference.

13. A wireless communication device, comprising:
    a memory that stores computer instructions;
    one or more processors that are configured to execute the computer instructions to:
      perform dynamic frequency selection prior to wireless communications;
      receive information regarding implementation of dynamic frequency selection by other wireless communication devices proximate to the wireless communication device;
      determine, based on the received dynamic-frequency-selection-implementation information, at least one pattern of channel changes among the other wireless communication devices; and
      modify the dynamic frequency selection of the wireless communication device for selecting channel changes based on the at least one pattern.

14. The wireless communication device of claim 13, wherein the one or more processors are configured to modify the dynamic frequency selection of the wireless communication device by being configured to execute the computer instructions to:

update an automatic channel selection algorithm used by the wireless communication device to perform the dynamic frequency selection.

15. The wireless communication device of claim 13, wherein the other wireless communication devices are proximate to the wireless communication device when co-channel interference occurs between the other wireless communication devices and the wireless communication device.

16. A wireless-device configuration system, comprising:
a memory that stores computer instructions;
one or more processors that are configured to execute the computer instructions to:
identify a plurality of wireless devices that are in a geographical area and that are configured to perform dynamic frequency selection;
monitor channel selections from the plurality of wireless devices' implementation of dynamic frequency selection;
determine, based on the monitored channel selections, at least one pattern of channel changes among the plurality of wireless devices; and
modify the dynamic frequency selection of a target wireless device in the geographical area for selecting channel changes based on the at least one pattern.

17. The wireless-device configuration system of claim 16, wherein the one or more processors modify the dynamic frequency selection of the target wireless device by being configured to execute the computer instructions to:
determine, based on the monitored channel selections, a configuration update for the target wireless device; and
send the configuration update to the target wireless device.

18. The wireless-device configuration system of claim 16, wherein the one or more processors modify the dynamic frequency selection of the target wireless device by being configured to execute the computer instructions to:
update an automatic channel selection algorithm used by the target wireless device to perform the dynamic frequency selection.

19. The wireless-device configuration system of claim 16, wherein the one or more processors are configured to execute the computer instructions to further:
modify the dynamic frequency selection of each of the plurality of wireless devices for selecting channel changes based on the at least one pattern.

20. The wireless-device configuration system of claim 19, wherein the one or more processors modify the dynamic frequency selection of the plurality of wireless devices by being configured to execute the computer instructions to:
update an automatic channel selection algorithm used by the plurality of wireless devices to perform the dynamic frequency selection; and
send the updated automatic channel selection algorithm to each of the plurality of wireless devices.

* * * * *